United States Patent
Taylor

[15] 3,662,852
[45] May 16, 1972

[54] AIR CUSHION VEHICLE

[72] Inventor: Robert Vincent Taylor, 3 Forrestall Road, Elizabeth Downs, Australia

[22] Filed: Jan. 4, 1971

[21] Appl. No.: 103,622

[52] U.S. Cl.............................................180/117, 180/127
[51] Int. Cl.........................................B60v 1/06, B60v 1/16
[58] Field of Search...................180/116, 117, 120, 121, 122, 180/127, 128, 129

[56] References Cited

UNITED STATES PATENTS

| | | | |
|---|---|---|---|
| 3,237,708 | 3/1966 | Strasser et al | 180/121 |
| 3,398,809 | 8/1968 | Wood et al | 180/127 X |
| 3,572,461 | 3/1971 | Bertin | 180/121 |

FOREIGN PATENTS OR APPLICATIONS

| | | | |
|---|---|---|---|
| 1,481,938 | 3/1969 | Germany | 180/120 |

*Primary Examiner*—Robert J. Spar
*Attorney*—Carl R. Brown

[57] ABSTRACT

An air cushion vehicle of the type wherein air at superatmospheric pressure in a plenum supports a vehicle and the vehicle is provided with an inflatable bag skirt, there being a duct extending between a blower on the one hand and both the bag skirt and the plenum on the other, the plenum containing a door which can be opened or closed to control pressure differential between the inflatable skirt and the plenum whereby the vehicle may be lifted to take-off point with the plenum door closed, and take-off can be achieved by opening of the plenum door.

11 Claims, 3 Drawing Figures

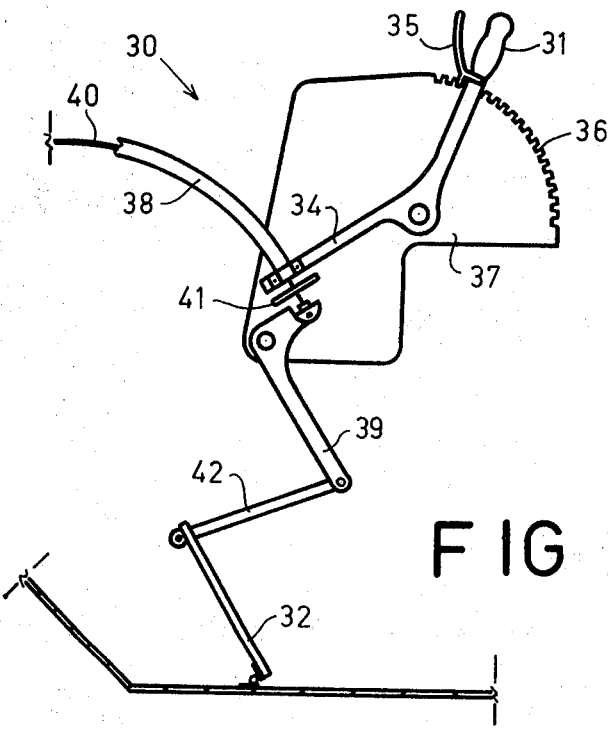
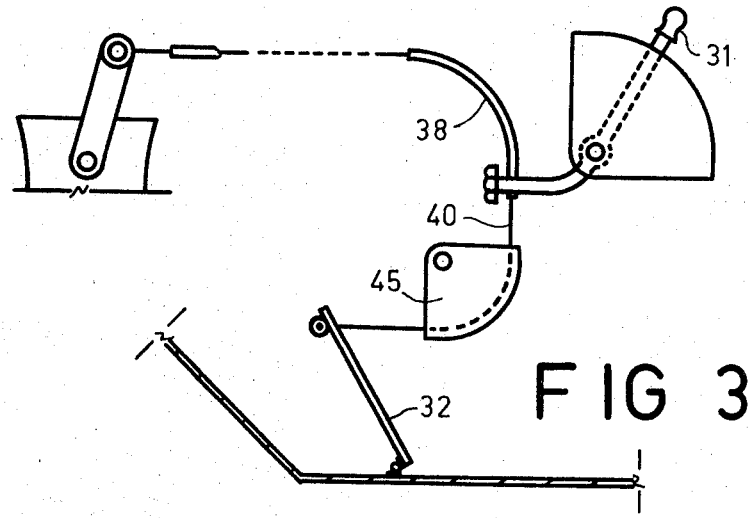
FIG 2
FIG 3

AIR CUSHION VEHICLE

This invention relates to an air cushion vehicle of the type wherein air at superatmospheric pressure in a plenum supports a vehicle above a surface over which the vehicle travels and the vehicle is propelled by displacement of air by an air screw.

Air cushion vehicles of this type are commonly constructed with separate engines for the air screws and the cushion fans, and this of course adds considerably to the cost. Furthermore it is well known that small engines are much less reliable than large engines, and the danger of breakdown is therefore much greater than if the engines were of larger size. To overcome this problem it has been proposed to utilize a single engine with a countershaft arrangement, a differential gear arrangement, or other power apportioning systems. However these are complicated and unwieldy and are of high cost.

One of the objects of this invention therefore is to provide a simplified mechanical transmission wherein, if desired, a single engine can be utilized both for the cushion fan and for an air screw for supplying thrust for the vehicle.

The invention may in one of its forms consist of a vehicle comprising air pressure imparting means, an inflatable bag skirt, a duct extending between the air pressure imparting means on the one hand and the skirt and the plenum on the other, a plenum door in the path of air flow to the plenum, and door control means arranged to control opening or closing of the plenum door to thereby control pressure differential between the inflatable skirt and the plenum. It then becomes possible to make use of known characteristics of fans and air screws, wherein a fan constitutes the air pressure imparting means for providing the cushion air and is arranged to be efficient at relatively low speed and the air screw at relatively high speed, and the fan can be arranged to provide sufficient air to fill the peripheral bag skirt, before the air screw efficiency is sufficient to apply any substantial thrust. This arrangement has the additional advantage that a vehicle can be lifted almost to take-off point by having the plenum door closed, and take-off can be achieved by opening the plenum door, so that the vehicle can be retained in frictional engagement with the ground or water and ready to move at low speed the instant that the frictional engagement is released by opening of the plenum door. This gives a chance to achieve smooth take-off under most conditions.

If the air cushion fan is of the centrifugal type, as speed increases beyond a given speed the efficiency will drop, and if the plenum door is partly closed as the efficiency drops, being opened only sufficiently to ensure that the air cushion exists, then the fan will be partially choked and thereby avoid the high power consumption which would otherwise exist. Thus the additional power available from an engine upon increase of speed is mostly available for driving of the air screw to apply thrust.

A problem which is encountered with air cushion vehicles is the danger of loss of air cushion upon reduction of motor speed, and in the event of the vehicle being provided with air screw for thrust, it becomes necessary for the minimum motor speed to be sufficient to ensure that some cushion remains. To achieve this the invention may include as one of its further features dual throttle means, one of the throttle means being arranged to be positioned at any one of a series of set positions corresponding to a respective series of engine speeds, and the second speed control means co-operating therewith and being operable only to increase engine speed above that fixed by the position of the first said speed control means. This then enables an operator to set the lower limit of engine speed at sufficient speed to ensure that air cushion will not collapse, and any speed thereafter is available for thrust. This arrangement has the additional advantage that the amount of lift of the vehicle can be limited and the vehicle can for example be arranged to have the bag skirt on one side engage water in the event of a turn being required over water, by leaning of the vehicle, or in the event of a larger vehicle, by introducing plenum air to one part only of the vehicle.

Embodiments of the invention are described hereunder in some detail with reference to and are illustrated in the accompanying drawings, in which:

FIG. 2 is a fragmentary side elevation of speed control means according to a first embodiment, and FIG. 3 is a similar fragmentary side elevation of speed control means according to a second embodiment.

Figure 1:
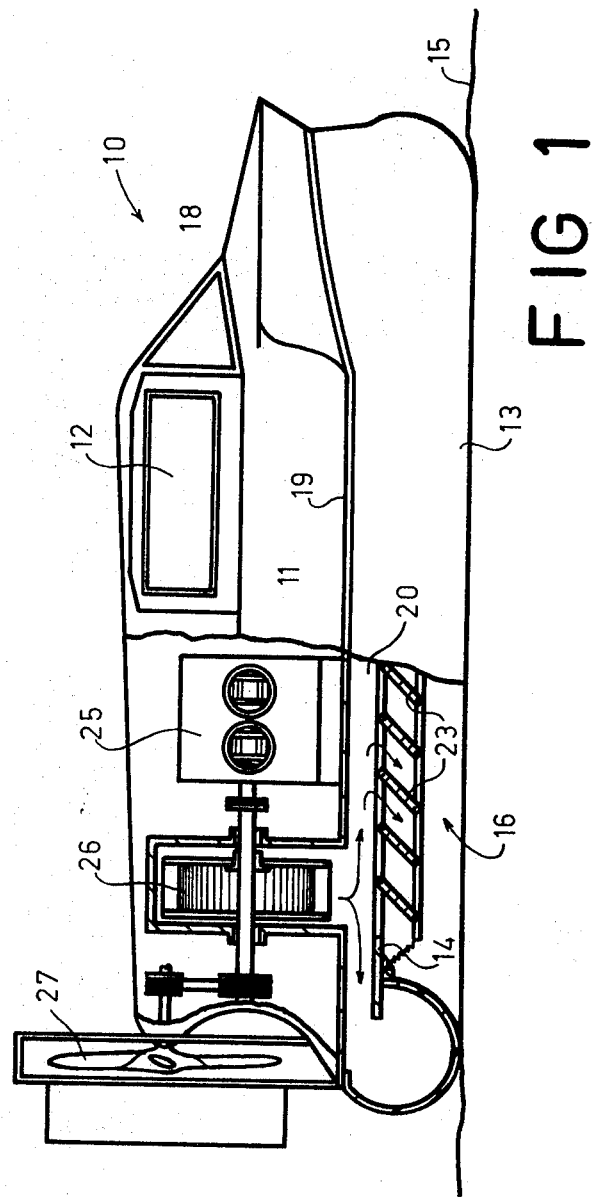
FIG. 1 is a partly sectioned elevation of an air cushion vehicle.

In FIG. 1 an air cushion vehicle 10 is provided with a "hard structure" hull 11 having a cabin 12 thereon, and a peripheral bag skirt 13 extending downwardly from the hull to define with a plenum wall 14 and the surface 15 over which the vehicle travels, a plenum 16.

One of the more serious hazards associated with air cushion vehicles is that of "tuck under" of the bag skirt, resulting in turn in "plow-in". Some bag skirts are arranged to extend outwardly from the hard structure before they extend downwardly and inwardly in a continuous curve. If the leading edge of such a bag skirt encounters a large object or a steep fronted wave of water, deflection of the bag is accompanied by downward movement, which results in further deflection or "tuck under" of the skirt, and the result is a plow-in or nose dive of the vehicle. In order to avoid this, this embodiment makes provision for a change of shape of the skirt 13 towards the front by extending the upper join line 18 upwardly, and further by utilizing a restraining rope 19 which prevents "ballooning" of the skirt at the bow end of the vehicle.

The vehicle 10 is provided with the plenum wall 14 which supports the inner edge of the peripheral bag skirt 13 on all sides, the plenum wall terminating at its edges above the opening of the bag. An air duct 20 exists above the plenum wall so that air from a cushion fan 21 will pass over the top of the upper plenum wall and enter the air bag on all sides. The plenum wall 14 is provided with a series of louvres 23 interconnected with one another and also interconnected to a plenum control lever (not shown), the louvres overlapping when closed to thereby provide a plenum door so that air from the duct can flow into the space within the peripheral bag skirt 13, thereby giving lift for the vehicle.

A single engine 25 is arranged to drive a single shaft 26 which carries on it the fan blades of the centrifugal cushion fan 21 for supplying cushion air and also an air screw 27 for supplying thrust.

The engine speed control means 30 is provided with a dual control, one being a hand control 31 and the other being a foot pedal control 32. The hand control 31 consists of an angled lever 37 one end of which is provided with a latch 35 which passes over teeth 36 in a quadrant 37 and the other end of which is coupled to the outer cover 38 of a Bowden cable. A transfer arm 39 of bell crank shape is positioned near the hand control lever, and one end of the transfer arm is coupled to the inner cable 40 of the Bowden cable. A stop 41 limits movement of the transfer arm. The other end of the transfer arm is connected by a rigid or flexible link 42 to the pedal control 32 so that the foot pedal operates the transfer arm. Thus the inner portion of the cable is coupled to the foot pedal and the outer portion to the hand control arm. The other end of the inner cable 40 is connected in the usual way to the throttle of the engine, and the arrangement is therefore such that initial speed of the engine can be regulated by means of the hand control which can then be locked in the desired position to give minimum speed which will enable the vehicle to be lifted by the bag skirt and to be just air-borne. Further speed of the engine is achieved only by control of the foot pedal and further speed is usable for the attaining of sufficient thrust to drive the vehicle. In this embodiment the idling speed is set at about 800 r.p.m. for the engine and at this speed the air cushion fan will drive sufficient air into the bag skirt to lift the vehicle off the ground. However at this speed the air screw is so inefficient that there is no appreciable thrust. If the engine speed is increased to say 1,500 r.p.m. the bag skirt will become inflated to give full clearance of the vehicle and although some thrust is developed by the air screw at this speed there is not sufficient thrust to force the bag over the ground surface. The air can be introduced to the plenum at this stage and the vehicle lifted just clear of the ground. However by increasing the speed to say 2,500 r.p.m. there is ample air to lift the vehicle from the ground by opening of the plenum door, and the thrust of the air screw will increase considerably. This then enables the vehicle to start moving in a forward direction, and by careful adjustment of the plenum door the minimum amount of air required to keep the vehicle on cushion can be adjusted by an operator, and this then makes available extra power to the air screw before thrusting of the vehicle in a forward direction. Any increase in speed will supply power used almost entirely for thrust purposes, since the choking effect of the plenum door will reduce the proportion of load due to the centrifugal fan. Upon sudden release of the accelerator pedal however the engine speed is still sufficient to ensure that the vehicle is lifted by the air cushion. In the event of the vehicle being a large vehicle, the plenum is divided into two portions one on each side of the vehicle by a central division member and the portions have separate doors, so that the doors can be differentially opened upon turning. This gives an automatic banking effect, and particularly in the event of the vehicle passing over water, the drag of the water can be made use of as the bag skirt engages the water.

The embodiment of FIG. 3 is substantially similar to that of FIG. 2, excepting that friction is utilized instead of the teeth 36, and that a pivoted quadrant 45 replaces the transfer arm 39 and link 42 of FIG. 2.

It will be seen that the conditions of driving a motor vehicle are somewhat simulated, in that there is a necessary co-operation on the part of an operator between the accelerator pedal and the plenum door control, and this is somewhat analogous to the co-operation existing between a motor vehicle clutch and its accelerator pedal. Thus the invention has the further advantage of providing a control which requires a minimum amount of tuition for an operator.

If the division of plenums is achieved with a transverse wall, manouverability is improved by, for example, reducing pressure in the front plenum and swinging the back of the vehicle. Alternatively the plenum may be divided into four or more divided portions.

Mechanical equivalents may be employed to the elements described in the above embodiment. For example, the quadrant 45 of FIG. 3 may be replaced by a short curved tube, for example, the outer sheath of a Bowden cable, but variations of this type will be seen to lie within the invention.

What I claim is:

1. An air cushion vehicle of the type wherein air at superatmospheric pressure in a plenum supports a vehicle above a surface over which the vehicle travels and the vehicle is propelled by displacement of air by an air screw, comprising an engine, air pressure imparting means coupled for drive to the engine, an inflatable bag skirt, a duct extending between the air pressure imparting means on the one hand and the skirt and the plenum on the other, a plenum door in the path of air flow to the plenum, and door control means arranged to control opening or closing of the plenum door to thereby control pressure differential between the inflatable skirt and the plenum.

2. An air cushion vehicle according to claim 1 wherein a horizontally extending plenum wall divides the plenum from the duct, the plenum wall having an opening therein, and the plenum door being arranged to close or partly close the opening.

3. An air cushion vehicle according to claim 2 wherein the plenum door comprises a plurality of interconnected louvres.

4. An air cushion vehicle of the type wherein air at superatmospheric pressure in a plenum supports a vehicle above a surface over which the vehicle travels and the vehicle is propelled by displacement of air by an air screw, comprising a horizontally extending wall forming the upper wall of the plenum, a centrifugal fan mounted above the horizontally extending plenum wall, an engine, drive means coupling the engine to the centrifugal fan, an inflatable bag skirt, a duct extending between the centrifugal fan on the one hand and the skirt and the plenum on the other, the plenum wall having an opening therein, a plenum door carried by the plenum wall and arranged to close or partly close said opening, and door control means coupled to the door and arranged to control opening or closing of the door to thereby in turn control pressure differential between the inflatable skirt and the plenum.

5. An air cushion vehicle according to claim 4 wherein the engine shaft, centrifugal fan and air screw are coupled for drive to one another.

6. An air cushion vehicle according to claim 4 wherein the cross-sectional shape of the inflatable bag skirt varies due to the position of its outer join line with the vehicle hull being higher from the base of the vehicle at and near the front than at the rear.

7. An air cushion vehicle according to claim 6 further comprising a restraining rope around the front end of the inflatable bag skirt retaining the upper portion of the skirt contiguous with the vehicle hull.

8. An air cushion vehicle according to claim 4 further comprising dual engine speed control means, position retaining means engaged by one of the speed control means arranged to secure that said speed control means in any one of a series of set positions corresponding to respective engine speeds, and interconnecting means coupling the second speed control means to the first speed control means and so constructed and arranged that the second speed control means is operable only to increase engine speed above that fixed by the position of the first said speed control means.

9. An air cushion vehicle according to claim 8 wherein first said speed control means is a hand control lever co-operating with position retaining means and coupled to the outer cover of a Bowden cable, while said second speed control means include a foot pedal coupled to the inner cable of a Bowden cable.

10. An air cushion vehicle according to claim 8 wherein said first speed control means is a hand control lever co-operating with position retaining means and coupled to the outer cover of a Bowden cable, the second speed control means including a foot pedal, and a bell crank and link coupling the inner cable of the Bowden cable to the foot pedal.

11. An air cushion vehicle according to claim 8 wherein said first speed control means is a hand control lever co-operating with position retaining means and coupled to the outer cover of a Bowden cable, and further comprising a foot control lever and pulley means, the inner cable of the Bowden cable being secured to the foot control lever but passing over pulley means between the foot control lever and the outer cover of the cable.

* * * * *